Feb. 24, 1970

J. T. DI GIROLAMO 3,497,166

TAPE PENDANT CONNECTOR

Filed July 14, 1967

INVENTOR.
JUSTIN T. DiGIROLAMO

BY

ATTORNEY

Feb. 24, 1970  J. T. DI GIROLAMO  3,497,166
TAPE PENDANT CONNECTOR

Filed July 14, 1967  3 Sheets-Sheet 2

INVENTOR.
JUSTIN T. DiGIROLAMO
BY

ATTORNEY

United States Patent Office 3,497,166
Patented Feb. 24, 1970

3,497,166
TAPE PENDANT CONNECTOR
Justin T. Di Girolamo, Blackwood, N.J., assignor to the United States of America as represented by the Secretary of the Navy
Filed July 14, 1967, Ser. No. 654,037
Int. Cl. B64f 1/02
U.S. Cl. 244—110     3 Claims

ABSTRACT OF THE DISCLOSURE

The subject disclosure relates to novel and improved apparatus for securing an energy absorbing nylon-type tape of an aircraft arresting system to the heavy steel cable pendant that extends across an aircraft landing area for engagement with incoming aircraft. The apparatus includes a fixed member and a movable member about which the tape of the system is wound so as to securely clamp the tape therebetween during the aircraft arresting operation with the energy absorbing tape that is coupled to the arresting engine.

---

The present invention relates to a noval and improved tape connector device. More particularly, it relates to a novel and improved device for securing a plurality of energy absorbing tapes of an aircraft arresting system to the relatively non-flexible steel cable or pendant that extends across an aircraft landing surface and engages the arresting hook of the aircraft during an arresting operation.

Various types of pendant-tape connectors have been used in aircraft arresting systems in the past. Heretofore, however, none of the same have been found sufficiently reliable or satisfactory in use. Thus, conventional connectors which require use of pins that extend through sewn loops of tape have been found inherently weak in the sewn or stitched tape loop. Various types of clamping devices have also been used heretofore for the interconnection between the pendant and the tape. Clamping devices used in the past, however, have been found to damage the tape, slip rather than provide a safe effective interconnection, and defy easy inspection of the tape for defects or deterioration during use.

It is therefore a principal object of the invention to provide a novel and improved tape-pendant connector which is reliable, safe and dependable in use.

It is a further object of the invention to provide a novel and improved dual tape-pendant connector for aircraft arresting equipment in which no sewn or stitched tape loops are required.

It is a further object of the invention to provide a novel and improved clamp type tape-pendant connector for aircraft arresting gear in which slippage of the tape is prevented.

It is a further object of the invention to provide a novel and improved clamp type tape-pendant connector for aircraft arresting gear in which the tape can be easily inspected for damage or deterioration during use at all times.

Other objects and many of the attendant advantages of this invention will be readily appreciated as the same becomes better understood by reference to the following detailed description when considered in connection with the accompanying drawing wherein.

Figure 1:
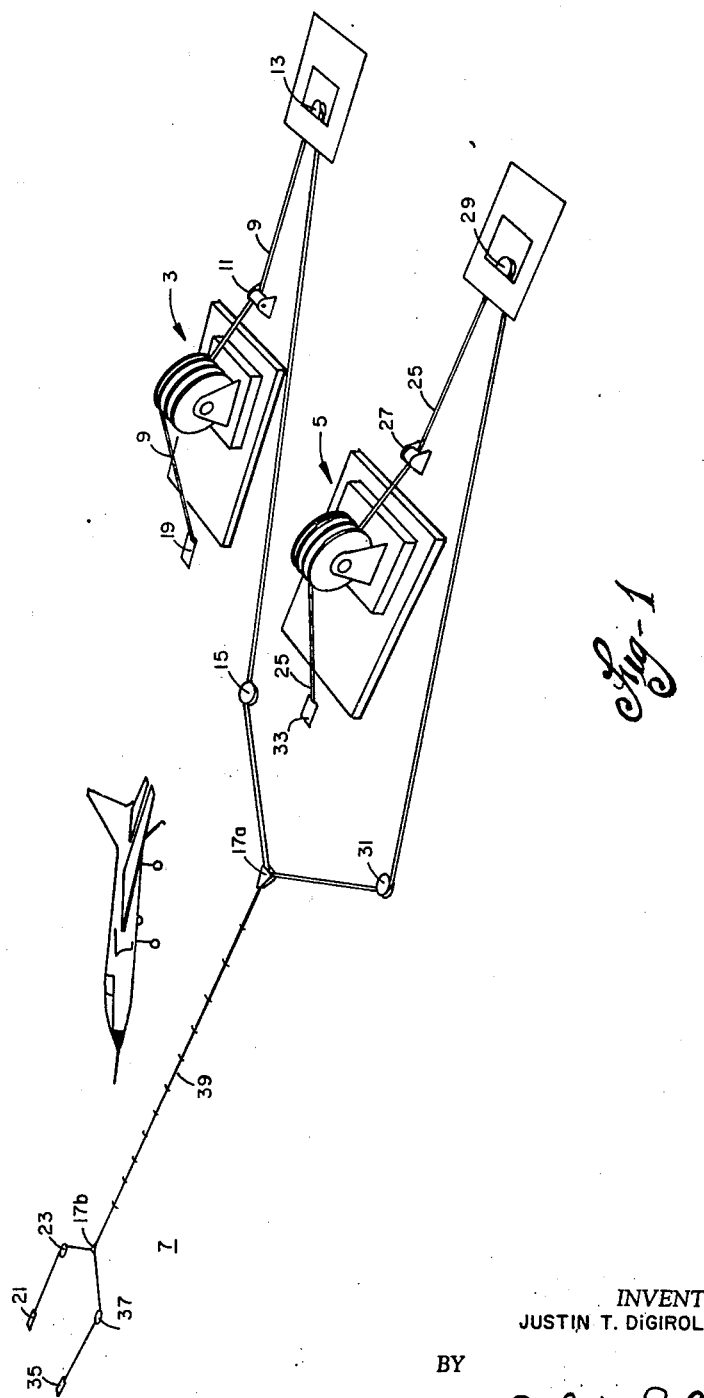
FIG. 1 is a perspective view of an aircraft arresting system in which the improved tape-pendant connector of the invention is employed.

Referring now to the various figures of the drawing, it will be noted that the pair of aircraft arresting engines 3 and 5 are positioned side by side on one side of the runway 7 of the landing surface. The energy absorbing tape 9 extends from one end of the engine 3 about the sheave assemblies 11, 13 and 15 to the improved tape clamp or connector device 17a of the invention. The energy absorbing tape 9 extends from the other end of the engine 3 about the deflector sheave 19 under the runway 7, about the deflector sheave 21 on the opposite side of the runway, and about the runway edge sheave assembly 23 to the tape clamp or connector 17b. Similarly, the energy absorbing tape 25 extends from one end of the engine 5 about the sheave assemblies 27, 29 and 31 to the tape clamp or connector 17a. The tape 25 extends from the other end of the engine 5 about the deflector sheave 33, under the runway, about the deflector sheave 35 on the other side of the runway, and about the runway edge sheave assembly 37 to the tape clamp or connector 17b. The aircraft engaging pendant 39 extends across the runway 7 between the tape clamps or connectors 17a and 17b.

Inasmuch as the specific structure of the arresting engines 3 and 5 form no part of the invention, details of the same are not included herein for the sake of simplicity. For a complete understanding of the invention, it need only be understood that as the tapes pay out during an arrestment, drums or reels of the engines, on which the tapes are wrapped, rotate hydraulic pumps connected to the reels which energize the hydraulic controlled brakes on the reels or drums to bring the aircraft to a programmed arrestment.

Figure 2:
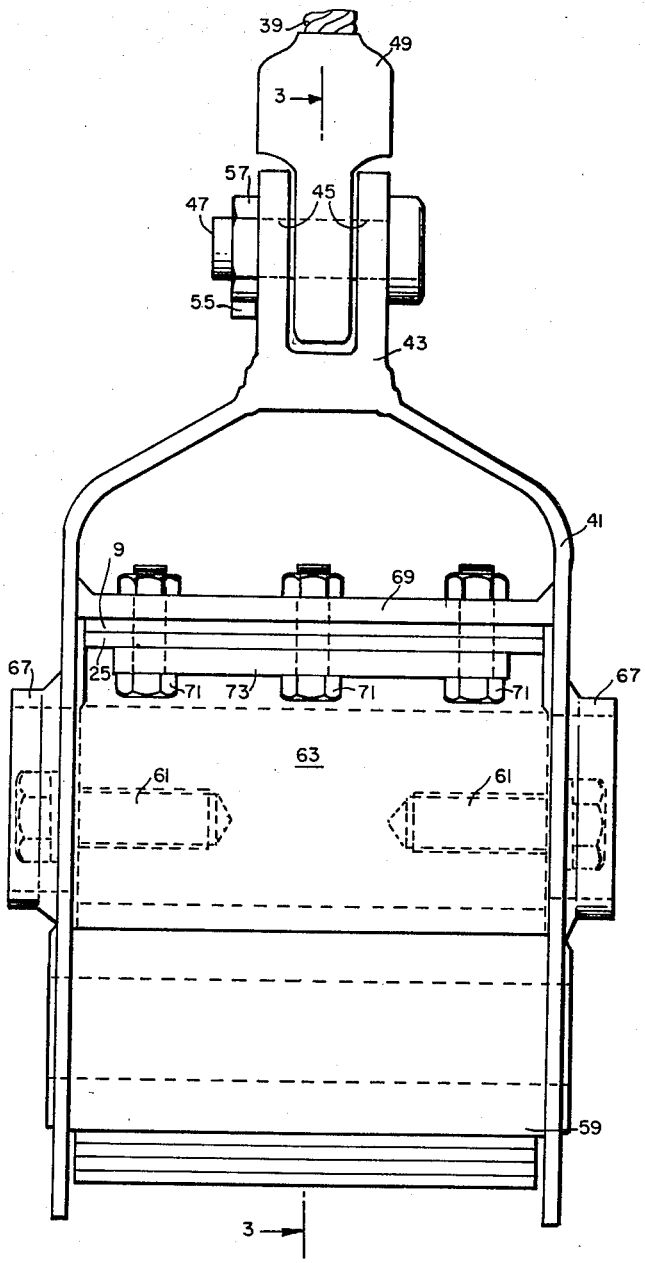
FIG. 2 is an end view of the improved tape-pendant connector of the invention.
Figure 3:
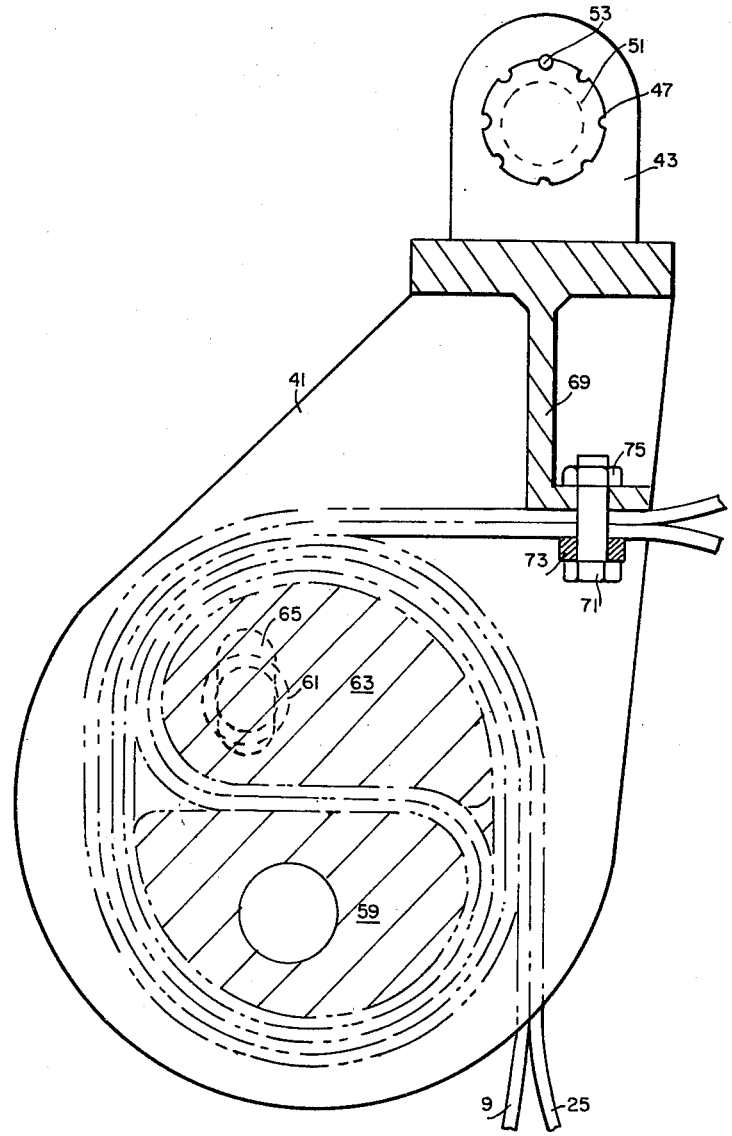
FIG. 3 is a cross-sectional view of the connector shown in FIG. 2 along reference line 3—3.

Details of the structure and design of the improved tape clamps or connectors 17a and 17b are illustrated in FIGS. 2 and 3. As shown therein, the frame 41 of each connector is generally U-shaped and may be fabricated or molded out of a suitable material to withstand the operating loads of the arresting system on the tapes and pendant. The clevis 43 is integrally attached as shown in any suitable manner to the outer surface of the closed extremity of the frame 41. The apertures 45 in the clevis 43 are aligned to receive the removable bolt member or the like 47 which passes through the eye in the fitting 49 secured to the end of the relatively non-flexible pendant or wire rope 39. The head of the bolt 47 is cut out at various points about its peripheral edge as at 51 to receive the locking screw 53 which threadedly engages complementary threads of an aperture in one side of the clevis 43. The tab 55 which is integrally secured to the other side of the clevis 43 engages the hexagonal edges of the nut 57 on bolt 47 and prevents its inadvertent removal. Ends of the fixed segment 59 are secured in any suitable conventional manner to opposed inner sides of the open end of frame 41. The outer peripheral surface of the fixed segment 59 between opposite sides of the frame 41 is suitably contoured so as to readily accommodate the flexible tapes 9 and 25 wrapped therearound in a manner which will be more apparent hereinafter. Bolts or studs 61 which are secured in and protrude a predetermined distance from opposite ends of the segment 63 pass through the slots 65 in opposite sides of frame 41 of the clamp and permit limited movement of the segment 63 toward and away from the juxtaposed fixed segment 59. The outer peripheral surface of the movable segment 63 is also contoured so as to readily accommodate the flexible tapes 9 and 25 wrapped therearound in a manner which will be more apparent hereinafter. Collars 67 are welded or otherwise suitably secured to the outer lateral surfaces of the frame 41 about the outer ends of the bolts or studs 61 and protect the same from injury or damage as the clamp moves back and forth over the landing surface. The L-shaped gusset plate 69 is secured to the inner peripheral surface of the closed end of frame 41 between its opposite edges and extends downwardly and then outwardly therefrom. The bolts 71 which secure the tape end engaging bar 73 to the outwardly extending portion of the gusset plate 69 pass through apertures in the gusset plate and the bar 73 and threadedly engage the nuts or the like 75.

In use of the improved clamp or connector of the invention, the pendant 39 is first coupled to the clevis 43 of the clamp by inserting the bolt or pin 47 through the clevis apertures 45 and the eye in the pendant terminal 49. The bolt or pin 47 is secured in its pendant coupling position by the nut 57 threaded on its open end, the screw 53 in the cut out portion of the bolt head and the tab 55 on the clevis that engages the peripheral edge of the nut 57. The converging tapes 9 and 25 from the arresting engines and their associated sheave assemblies are directed over the upper surface of the movable segment 63, around the peripheral surface of the fixed segment 59, between the fixed and movable segments 59 and 63, around the upper surface of the movable segment 63 and the lower surface of the fixed segment 59, and around the upper surface of the movable segment 63 between the gusset plate 69 and the tape end anchoring bar 73. Bolts 71 pass through apertures in the gusset plate 69, the tape anchoring bar 73 and the tapes 9 and 25 and secure the ends of the tapes to the clamp assembly.

When an aircraft approaches the runway 7 for a landing and engages the pendant 39, the portions of the tapes looped about the movable and fixed segments 59 and 63 draw the movable segment toward the fixed segment into a tight clamping engagement with portions of the tape passing therebetween and provide a secure connection between the tape and the clevis connected pendant 39. The positive connection of the tape between the tape anchoring bar 73 and the clamp assembly avoids slippage of the tape through the clamp. The open construction of the clamp assembly facilitates ready inspection of tape for damage or deterioration at any time.

Obviously, many modifications and variations of the present invention are possible in the light of the above teachings. It is therefore to be understood that the invention may be practiced otherwise than as specifically described.

What is claimed is:

1. In aircraft arresting equipment having a pendant that extends across a landing surface, a pair of energy absorbing devices and tape means interconnected between the pendant and the energy absorbing devices; apparatus for securing the tape means to the pendant comprising:
    (a) a clevis which is removably secured to the pendant;
    (b) a U-shaped frame, the closed end of the frame being secured back-to-back to the closed end of the clevis;
    (c) a fixed segment which extends between opposite ends of the U-shaped frame;
    (d) another segment which is pivotably positioned between opposite sides of the U-shaped frame, the said other segment also being movable a predetermined distance toward and away from the juxtaposed fixed segment;
    (e) and an L-shaped gusset plate that extends downwardly from the closed end of the U-shaped frame between the sides of the frame, the tape means extending from respective energy absorbing devices successively around the upper contour of the movable segment, between the segments, around the lower contour of the fixed segment to a point of securement on the gusset plate.

2. The apparatus substantially as described in claim 1 wherein the peripheral surfaces of the fixed and movable segments are contoured so as to readily accommodate the enwrapped tape means.

3. The apparatus substantially as described in claim 1 wherein the sides of the U-shaped frame extend beyond the outer periphery of the tape means wrapped about the fixed and movable segments and protect the tape means from undue abrasion as the apparatus moves over the landing surface.

References Cited

UNITED STATES PATENTS

| | | | |
|---|---|---|---|
| 2,429,926 | 10/1947 | Davis | 24—197 |
| 3,131,450 | 5/1964 | Zinkel | 24—197 |
| 3,215,375 | 11/1965 | Radovitz | 244—110 |
| 3,237,263 | 3/1966 | Holmberg | 24—196 |
| 3,365,756 | 1/1968 | Bayon | 24—196 XR |

MILTON BUCHLER, Primary Examiner

PAUL E. SAUBERER, Assistant Examiner

U.S. Cl. X.R.

24—196